(12) United States Patent
Surman

(10) Patent No.: US 7,123,287 B2
(45) Date of Patent: Oct. 17, 2006

(54) AUTOSTEREOSCOPIC DISPLAY

(76) Inventor: Philip A. Surman, 3 Rockingham Parade, Uxbridge, Middlesex (GB) UB8 2UW ( * ) Notice: Subject to any disclaimer, the term of this patent is extended or adjusted under 35 U.S.C. 154(b) by 182 days.

(21) Appl. No.: 10/964,828

(22) Filed: Oct. 15, 2004

(65) Prior Publication Data
US 2005/0117016 A1    Jun. 2, 2005

Related U.S. Application Data

(63) Continuation of application No. PCT/GB03/01706, filed on Apr. 17, 2003.

(30) Foreign Application Priority Data
Apr. 17, 2002  (GB)  ................................ 0208814.4

(51) Int. Cl.
*H04N 13/04* (2006.01)
*G02B 27/21* (2006.01)

(52) U.S. Cl. ........................................ 348/51; 359/463
(58) Field of Classification Search .............. 348/51, 348/47, 59, 42, 54; 359/463; 250/201.8
See application file for complete search history.

(56) References Cited

U.S. PATENT DOCUMENTS

| | | | | |
|---|---|---|---|---|
| 4,002,899 | A | * | 1/1977 | Stauffer .................... 250/201.8 |
| 5,083,199 | A | | 1/1992 | Borner |
| 5,510,831 | A | * | 4/1996 | Mayhew ...................... 348/47 |
| 5,930,037 | A | * | 7/1999 | Imai ........................... 359/463 |
| 5,959,664 | A | * | 9/1999 | Woodgate .................... 348/59 |
| 5,991,073 | A | | 11/1999 | Woodgate et al. |
| 6,014,164 | A | | 1/2000 | Woodgate et al. |
| 6,061,489 | A | | 5/2000 | Ezra et al. |
| 6,151,062 | A | | 11/2000 | Kazutaka et al. |
| 6,160,527 | A | | 12/2000 | Morishima et al. |
| 6,204,967 | B1 | | 3/2001 | Morishima et al. |
| 6,462,871 | B1 | | 10/2002 | Morishima |

* cited by examiner

FOREIGN PATENT DOCUMENTS

EP            1102106          5/2001

OTHER PUBLICATIONS

Redert, A. et al., "ATTEST: Advanced Three-dimensional Television System Technologies", *Proc. of the First International Symposium on 3D Data Processing Visualization and Transmission*, 2002.

*Primary Examiner*—Gims Philippe
(74) *Attorney, Agent, or Firm*—David R. Yohannan; Kelley Drye & Warren, LLP

(57) ABSTRACT

A multi-viewer autostereoscopic display system having a viewing field across which the system is capable of steering exit pupils, in each of which a viewer is capable of viewing an image for a selected eye. The system comprises an image forming device for generating an image by selective attenuation of radiation, an array of optical elements for projecting radiation towards the image forming device, and an array of radiation output positions for outputting radiation into the array of optical elements. Sets of radiation output positions respectively extend over a horizontal width associated with an optical element and have selectable positions such that an exit pupil is formed in a selected part of the viewing field. Each set of radiation output positions has an associated aperture for limiting the horizontal extent of the light projected from the radiation output positions. The apertures have a horizontal extent which is less than the horizontal width of the associated set of radiation output positions.

21 Claims, 17 Drawing Sheets

(a) Single Lens

TOP VIEWS (b) Lens Array (a) Axial Rays

TOP VIEWS (b) Off-axis Rays

The side folding mirrors are in contact with the vertically folding mirrors. An exploded view is shown for clarity.

TOP VIEW (a) Configuration of Lens Equivalent Optics (b) Illumination Sources arranged as an X/Y Matrix (a) Parallax Barrier

SIDE VIEWS (b) Lenticular Screen (a) Right Pixels Illuminated

SIDE VIEWS (b) Left Pixels Illuminated

(a) Faded Apertures with Optimum Image Width (b) Resultant Intensity with Narrowed Aperture Images (c) Resultant Intensity with Wider Aperture Images

AUTOSTEREOSCOPIC DISPLAY

CROSS REFERENCE TO RELATED APPLICATIONS

This application is a continuation of International Application No. PCT/GB03/01706, filed Apr. 17, 2003, entitled "Autostereoscopic Display", which claims priority under 35 U.S.C. 119 to Great Britain Application No. 0208814.4, filed Apr. 17, 2002, entitled "Autostereoscopic Display System With Horizontal Apertures." The entire contents of these applications are hereby incorporated by reference.

FIELD OF THE INVENTION

The invention relates to the field of autostereoscopic display devices where viewers who do not have to wear special glasses can see three dimensional ("3D") images. In particular, but not exclusively the invention relates to supplying stereo images to several viewers who have a relatively high degree of freedom-of-movement.

BACKGROUND OF THE INVENTION

Prior art 3D displays have been described in a large variety of publications, including "New Autostereoscopic Display System", Ezra, Woodgate, Omar, Holliman, Harrold and Shapiro (1995), SPE Proceedings "Stereoscopic Displays and Virtual Reality Systems II" Vol. 2409, pp 31–40; "Retroreflective Screens and their Application to Autostereoscopic Displays" Harman, SPIE Proceedings "Stereoscopic Displays and Virtual Reality Systems IV", Vol. 3012, pp 145–153; "Stereoscopic Display Employing Head-position Tracking using Large Format Lenses", Hattori, (1993), SPIE Proceedings "Stereoscopic Displays and Applications IV" Vol. 1915, pp 2–5; "Three-Dimensional Display with Focused Light Array" Kajiki, Yoshikawa, and Honda (1996), SPIE Proceedings "Practical Holography X" Vol. 2652 pp 106–116; "Perfect 3-Dimensional Movies and Stereoscopic Movies on TV—and Projection Screens; An Appraisement", Klein and Dultz (1990), SPIE Proceedings "Stereoscopic Displays and Applications" Vol. 1256, pp 289–295; "Stereoscopic Liquid Crystal Display II (Practical Application)", Nishida, Hattori, Sakuma, Katayama, Omori and Fukyo (1994), SPIE Proceedings "Stereoscopic Displays and Virtual Reality Systems", Vol. 2177, pp 150–155; "Lenticular Stereoscopic Display System with Eye-Position Tracking and without Special-Equipment Needs", Omura, Tetsutani and Kishino (1994), SID 94 Digest, pp 187–190; "Head-Tracking Stereo Display: Experiments and Applications", Paley (1992), SPIE Proceedings "Stereoscopic Displays And Applications III", Vol. 1669, p88; "Head Tracking Stereoscopic Display", Schwartz (1985), Proceedings of IEEE International Display Research Conference, pp 141–144; "Parallax Barrier Display Systems" Sexton (1992), IEE Colloquium "Stereoscopic Television" Digest No: 1992/173, pp 5/1–5/5; U.S. Pat. No. 5,712,732; "3D-TV Projection Display System with Head Tracking", Tetsutani, Ichinose and Ishibashi (1989), Japan Display '89, pp 56–59; "A Study on a Stereoscopic Display System Employing Eye-position Tracking for Multi-viewers", Tetsutani, Omura and Kishino (1994), SPIE Proceedings "Stereoscopic Displays and Virtual Reality Systems", Vol. 2177, pp 135–142; "Autostereoscopic Display using Holographic Optical Elements", Trayner and Orr (1996), SPIE Proceedings "Stereoscopic Displays and Applications VII", Vol. 2653, pp 65–74; "Developments in Autostereoscopic Displays using Holographic Optical Elements", Trayner and Orr (1997), SPIE Proceedings; and "Observer Tracking Autostereoscopic 3D Display Systems", Woodgate, Ezra, Harrold, Holliman, Jones and Moseley (1997), SPIE Proceedings "Stereoscopic Displays and Virtual Reality Systems IV", Vol. 3012, pp 187–198.

3D displays have been used in a variety of niche applications for many years, and as the quality of the display systems has improved, so too has the range of applications. Broadcast television is probably the largest potential application, however the requirements of a television system are complex and few, if any, existing display systems can meet these requirements.

There are various desirable requirements for a display suitable for a broadcast television system. It would be desirable to provide a display that can present stereo images to several viewers who will occupy a typical 'living room' sized region. Such a system is more complex than those intended for single viewers proposed, for example, for computer monitor or arcade game applications.

The overall size of the display should preferably not be excessive, as is the case with some systems, for instance those where there is a moving pair of projectors for each viewer. A basic requirement for a domestic television display is that it will fit through a door. The size of the proposed display will be in the order of that of current back-projected televisions.

Some prior art autostereoscopic displays operate by providing regions in front of the screen where a left image only is seen across the complete width of the screen, and adjacent regions where a right image only is seen. These regions are referred to as the exit pupils. The positions of these exit pupils follow the viewers' eye positions by being controlled by the output of a head position tracker that determines where the viewers' eyes are located in front of the screen. The advantage of head tracking is it ensures nothing is displayed that is not actually seen by a viewer, thus placing the least demands on the amount of information that has to be displayed.

Referring to FIG. 1, in principle, an exit pupil could be formed with a large lens 9 located close to the LCD display, with an illumination source 8 positioned behind it. Consider an eye located at the exit pupil 10 in FIG. 1(a); in this position it will observe illumination over the complete area of the lens. When away from the pupil, the eye will see either no illumination or illumination over part of the lens only.

However, this would be an impracticably large configuration for a display. In FIG. 1(b) it can be seen that the single large lens can be replaced by an array of lenses 12 each with its own small light source 11. The sources 11 all lie in one plane. In this case, the exit pupil 13 is formed from a bundle of approximately parallel rays from array 12 as opposed to the continuously converging rays from lens 9.

Prior art systems which use an array of cylindrical lenses for producing vertical exit pupils have drawbacks when used in a 3D display. Firstly, off-axis aberrations limit the off-axis performance so that the display would not provide exit pupils over a region sufficiently wide for multiple-user applications. Secondly, it is difficult to make the boundaries between the lenses invisible.

SUMMARY OF THE INVENTION

In accordance with the present invention, there is provided an autostereoscopic display system having a viewing field across which the system is capable of steering exit pupils, in each of which a viewer is capable of viewing an image for a selected eye, wherein the system comprises an image forming device for generating an image by selective attenuation of radiation, an array of optical elements for projecting radiation towards said image forming device, and an array of radiation output positions for outputting radiation into said array of optical elements, wherein a plurality of sets of radiation output positions are provided, each set extending over a corresponding horizontal width which is associated with one of said optical elements, the radiation output positions being selectable such that an exit pupil is formed in a selected part of the viewing field by selection of at least one radiation output position from each of the plurality of sets of radiation output positions, wherein each said set of radiation output positions has an associated aperture for limiting the horizontal extent of the light output from the radiation output positions, said apertures each having a horizontal extent which is less than the horizontal width of the associated set of radiation output positions.

By use of the present invention, an autostereoscopic display may be produced whereby a plurality of viewers having a relatively high degree of freedom-of-movement within the viewing field may be supplied with 3D images across the image forming device, which may for example be a display screen.

Further features and advantages of the present invention will become apparent from the following description of preferred embodiments of the invention, given by way of example only, made with reference to the accompanying drawings.

BRIEF DESCRIPTION OF THE DRAWINGS

FIG. 13(*b*) shows light output positions as a two-dimensional matrix;

DETAILED DESCRIPTION

Figure 2:
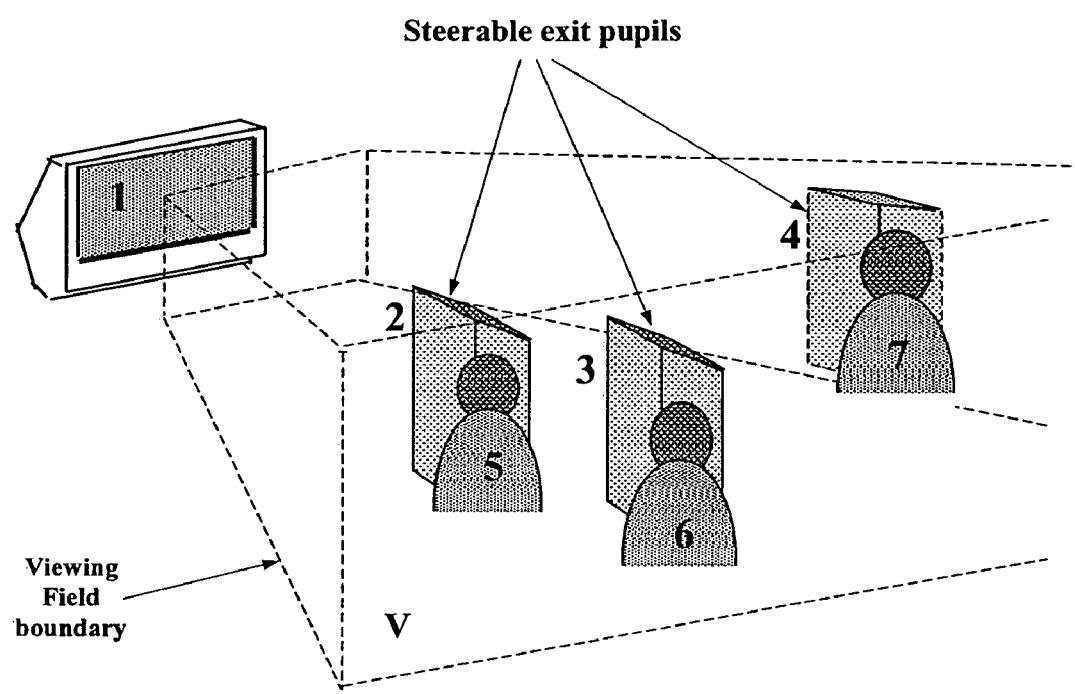
FIG. 2 shows a 3D display system in accordance with the present invention.

Referring to FIG. 2, a 3D autostereoscopic display 1 in accordance with an embodiment of the invention produces regions 2, 3 and 4 where a left image only is seen over the complete width of the screen by viewers 5, 6 and 7 respectively. The positions of these regions, referred to as exit pupils, are determined by steering optics located behind the screen. A head position tracker system (not shown) controls the steering optics to ensure these exit pupils are always located at the viewers' left eyes. The construction of head tracking devices, including for example a camera combined with eye position recognition processing apparatus, is known in the art and will not be described here in any detail. Each viewer's eye positions are separately tracked. The exit pupils are vertical volumes with a diamond-shaped section as shown in the figure and can be steered both laterally and fore-and-aft within a viewing field V. The steering optics produce two exit pupils for each viewer. For each left exit pupil formed, right exit pupils, which are not shown in the figure, are produced to the right of each left pupil. Preferably, the system is arranged to cater for any number up to as many viewers as can be accommodated without breakage of sight of the screen. The system is preferably capable of projecting exit pupils to the right and left eyes of at least two viewers, yet more preferably three or more.

The display 1 comprises a screen assembly with a steering optics assembly located behind it. The steering optics produce the multiple exit pupils in front of the screen assembly as shown in FIG. 2. For ease of explanation, this figure shows only the left exit pupils that are directed to the left eyes of the viewers. In the actual display, right exit pupils will accompany these pupils.

In one embodiment, both left and right images, which are projected into the exit pupils by the steering optics, are displayed on alternate rows of pixels on a liquid crystal display (LCD) in the screen assembly; this arrangement is referred to as spatial multiplexing and halves the vertical spatial resolution of each image. Spatial multiplexing is used to display left and right images without noticeable flicker. Alternatively, with a sufficiently fast display, the steering optics configuration may be used for operation in a left and right eye field sequential mode, to increase the vertical spatial resolution. The control of the LCD is carried out by means of an LCD control unit (not shown) within the display system. The LCD control unit may receive stereo image signals from a video input device (not shown), such as a broadcast receiver, a video media player, such as a DVD player, etc.

The steering optics, consisting of an array of optical elements to be described in further detail below, has the ability to produce exit pupils over a considerable range of distances from the screen assembly; unlike most other systems where viewers are confined to being close to an optimum viewing distance. The optics can also produce the pupils over a range of horizontal angles within the viewing field.

Steering is achieved with the use of switched lighting sources and/or a spatial light modulator (SLM). The light sources or spatial light modulator produce a set of radiation output positions for each of the optical elements of the steering array, from which light is output into the corresponding optical element. These output positions are selectable such that an exit pupil is formed in a selected part of the viewing field by selection of at least one radiation output position from each of the sets of radiation output positions, each set extending over a given horizontal width. The control of the light output positions is carried out by means of a steering control unit (not shown) within the display system connected to the head tracking device of the display system.

In one embodiment the display provides the same image-pair to all viewers in the viewing field. The use of two images keeps bandwidth requirements relatively low and reduces the complexity of the LCD. Such an arrangement however does not allow for the presentation of motion parallax, the ability to 'look around' objects. The image-pair may be produced by spatial multiplexing, described below, or by increasing the frame rate by a factor of two whilst projecting a different image into the left and right exit pupils respectively. In other embodiments, motion parallax is provided by the presentation of individual image-pairs to different viewers. If there are N viewers in the viewing field, 2 N views will be presented. These different views can be presented by the use of spatial multiplexing, namely producing separate images on different lines of the LCD and projecting the different images into the different exit pupils. This would reduce the vertical resolution of the display, compared to the arrangement providing the same image-pair to all viewers using spatial multiplexing, by a factor of N. Alternatively, the frame rate may be increased by a factor of N, compared to the arrangement providing the same image-pair to all viewers using a frame-based multiplexing different images into different exit pupils during different frames to give motion parallax to N viewers without loss of vertical resolution. The steering optics of the present invention has the capability to operate under either of these conditions.

Figure 3:
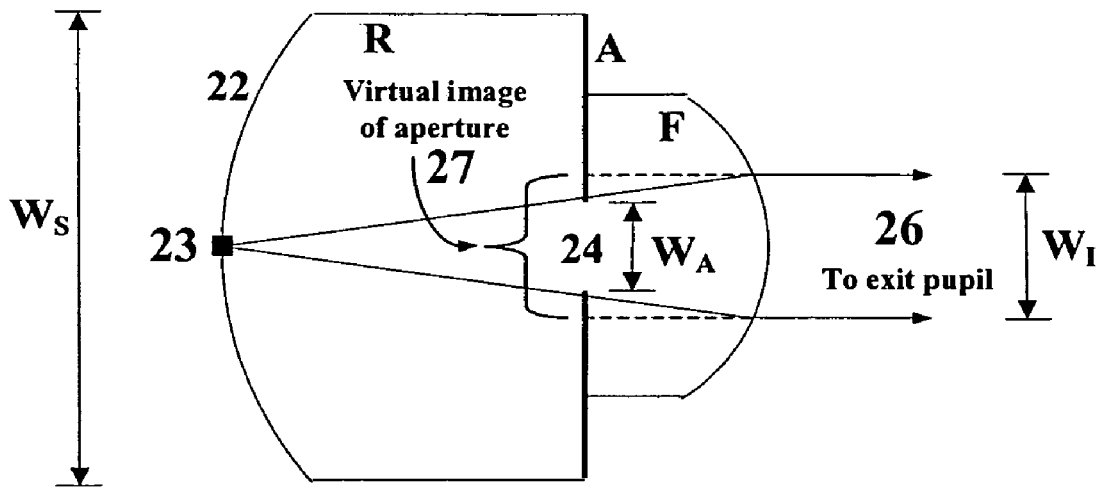
FIG. 3 shows in plan view an optical element in accordance with one embodiment of the invention.
Figure 3:
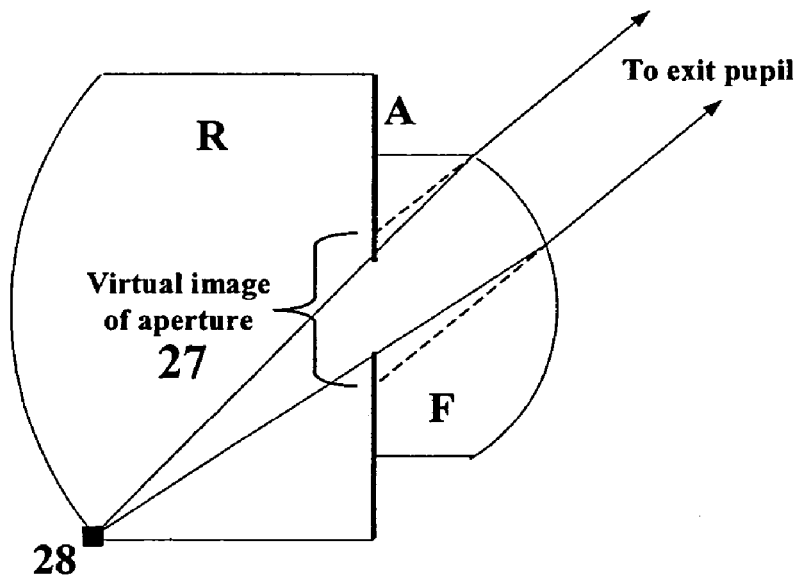

FIG. 3 illustrates, in plan view, an optical element of a steering array used to project radiation towards the LCD. The optical element includes a front portion F and a rear portion R, separated by a partially opaque surface A forming an aperture defining a region through which light is projected from the rear portion R to the front portion F. The optical element is a thin planar element, of which the rear and front portions are formed from a transparent material such as moulded glass. The front and rear portions are formed of a vertically thin material having a horizontal outline as shown in FIG. 3. The rear portion R has a rear surface which is cylindrical, having a vertical axis located substantially at the centre of the aperture 24. The front portion F has a cylindrical front surface having a vertical axis which is also substantially centred on the aperture 24. The radius of curvature of the front surface 25 is less than that of the rear surface 22. The rear surface 22 has a set of light output positions, in the form of light sources, arranged with a uniform pitch in a curved configuration in abutment with the rear surface 22 to output light into the optical element. The light output positions extend over a width $W_S$, referred to herein as the source width, which is both larger than the aperture width $W_A$ and the aperture image width $W_1$.

Making both the illumination surface 22 and the refracting surface 25 cylindrical, and with a common vertical axis, as in FIG. 3($a$), can solve the problem of off-axis aberration. Although spherical aberration is still present, it is limited by the aperture 24. The aperture width $W_A$ is preferably less than a quarter of the source width $W_S$. A correcting surface may also be used at the aperture, operating in the same manner as a Schmidt telescope corrector. The centre of this aperture coincides with the common axis. A light output position at 23 will give rise to the approximately parallel exit beam 26 whose width is close to that of the aperture 24 multiplied by the refractive index, which is typically in the region of 1.4 to 1.6. Also, the width $W_1$ of the virtual image of the aperture 27 is approximately the aperture width $W_A$ multiplied by the refractive index. The aperture image width $W_1$ may be in the region of a quarter the source width $W_S$.

In FIG. 3($b$) the extreme off-axis illumination source 28 produces a narrower exit beam 30, however, this beam still appears to originate from a virtual image 27 that is approximately the aperture width multiplied by the refractive index. Also, it does not suffer from significant off-axis aberrations.

The significance of these effects, along with the reduction of a visible boundary between array elements, will be apparent from the description in a later section.

Figure 1:
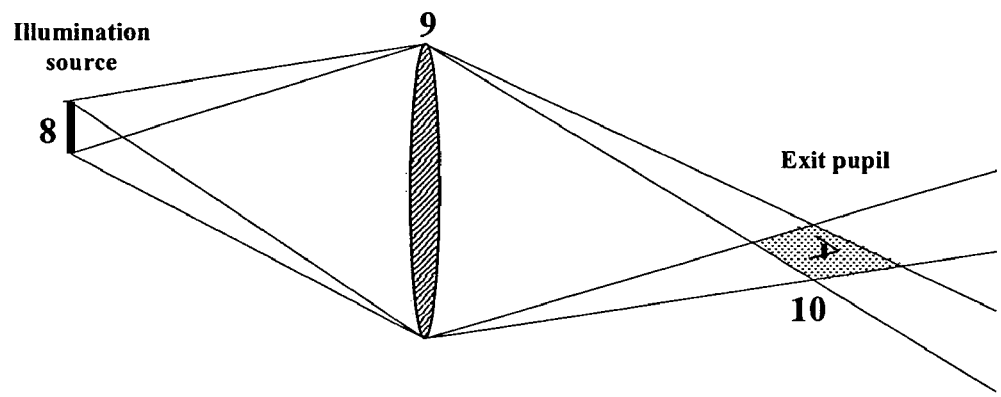
FIG. 1 illustrates the manner in which single large lens, or alternatively, a compact array of lenses, can be used to generate an exit pupil.
Figure 1:
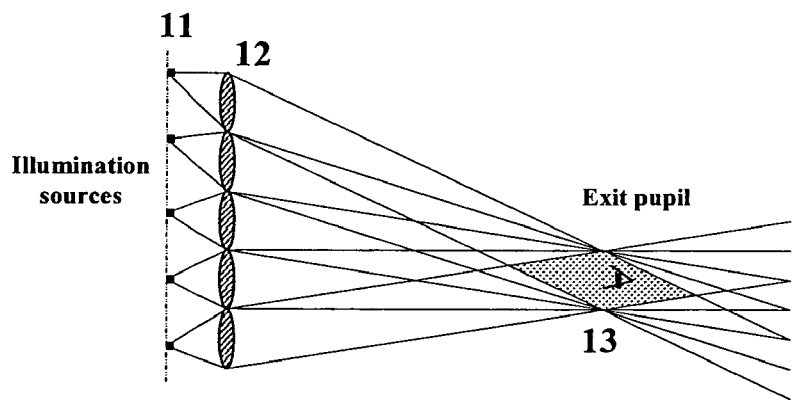
Figure 4:
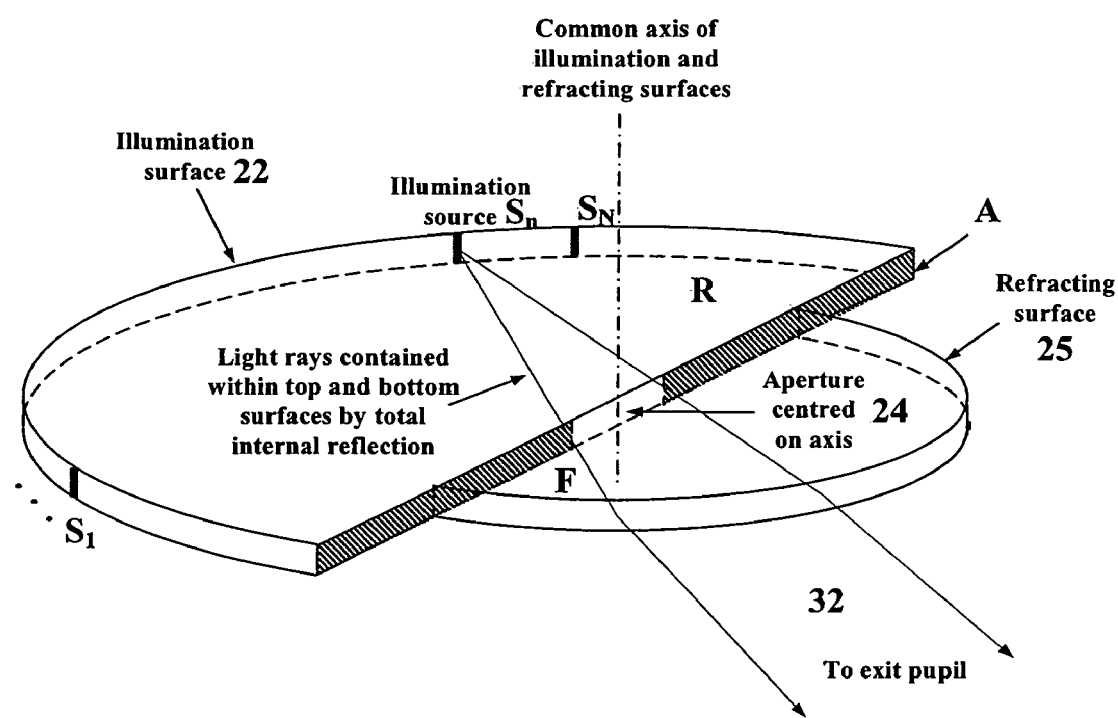
FIG. 4 is a perspective view of an optical element similar to that shown in FIG. 3.

In FIG. 3($a$) it can be seen that the virtual image 27 of the aperture 24 is considerably less than the overall width of the array element. Therefore the elements cannot be butted together as are the lenses 12 in FIG. 1($b$) and each element cannot run the complete height of the display or be located directly behind it. In one embodiment, an array is constructed from elements to be configured to give continuous illumination in the horizontal direction, and also to minimise the volume of refracting material, as shown in FIG. 4. This shows only one active illumination source $S_n$, selected from the element's entire set of sources, $S_1 \ldots S_N$, and one exit beam 32, but in practice there will be at least one active source and one exit beam for each viewer, selected at each element. Also, the sides of the front optical element F and the rear optical element R are preferably truncated, as in FIG. 5, to reduce the width and material used.

The light from the sources is contained within the element, in particular by the upper and lower planar surfaces thereof, by total internal reflection until it emerges from the front refracting surface 25. The use of total internet reflection enables the element to be relatively thin in its vertical dimension, e.g. in the order of one to two millimetres thick, thereby keeping the array relatively small.

Figure 5:
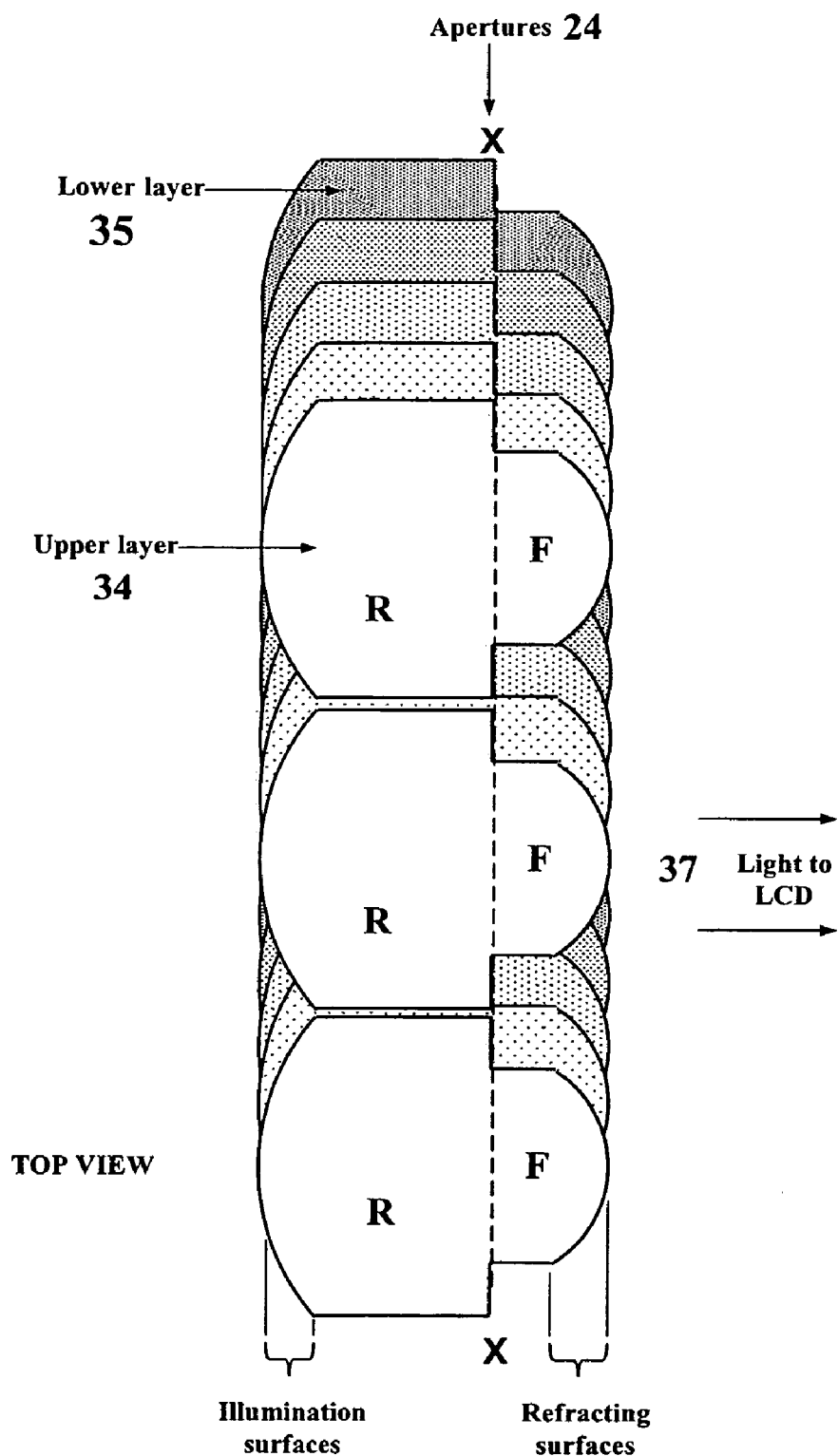
FIG. 5 is a plan view of a steering array construction in accordance with an embodiment of the invention.

Continuous illumination over the complete width of the array is achieved by staggering the array elements as in FIG. 5. This shows a five-layer, fifteen-element array. The upper layers 34 are shown unshaded, with the shading becoming darker, down to the lowest layer 35 with the heaviest shading. The actual number of layers in a particular display will be determined by the size of the viewing field and of the display.

Figure 6:
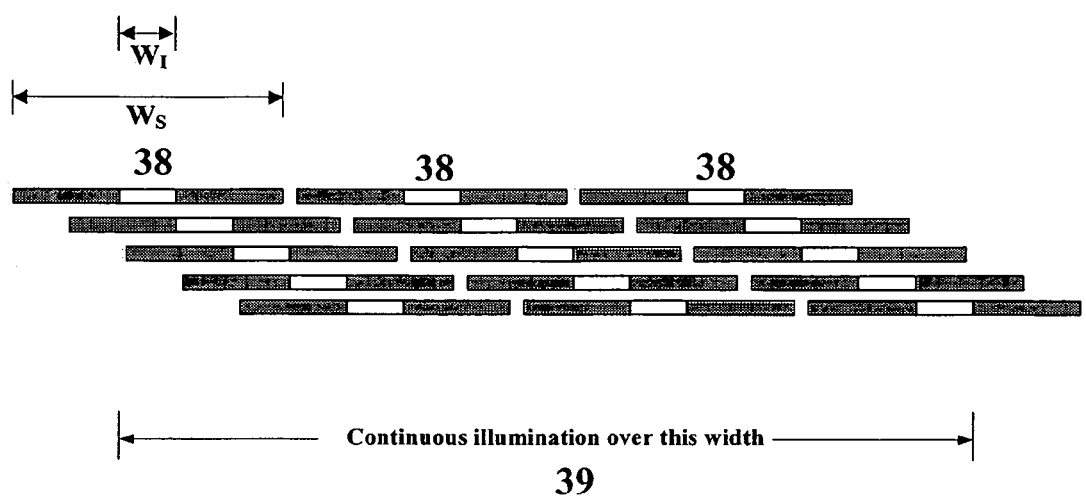
FIG. 6 is a front view of the array shown in FIG. 5.

All the apertures of the array, and their virtual images, lie in a single plane X-X. The appearance of the front of the array is shown in FIG. 6. In the case of the fifteen-element array shown in FIG. 8, the aperture images form the three diagonal subsets 38 each covering a distinct portion of the horizontal width 39, so that there is continuous illumination over the width 39. The elements within a subset are stacked on top of one another so that there is vertical overlap between all the elements in a subset and staggered laterally so that the virtual image of each adjacent aperture in the subset is substantially contiguous. As can be seen, the elements are staggered by a pitch equal to the image width $W_1$ so as to provide continuous illumination over the entire width of the array.

Curved arrays of white light emitting diodes (LEDs), arranged with a horizontal pitch of between 0.5 mm to 1.5 mm may be used to provide the set of light sources for each array element, arranged to output light into the rear optical element R.

Figure 7:
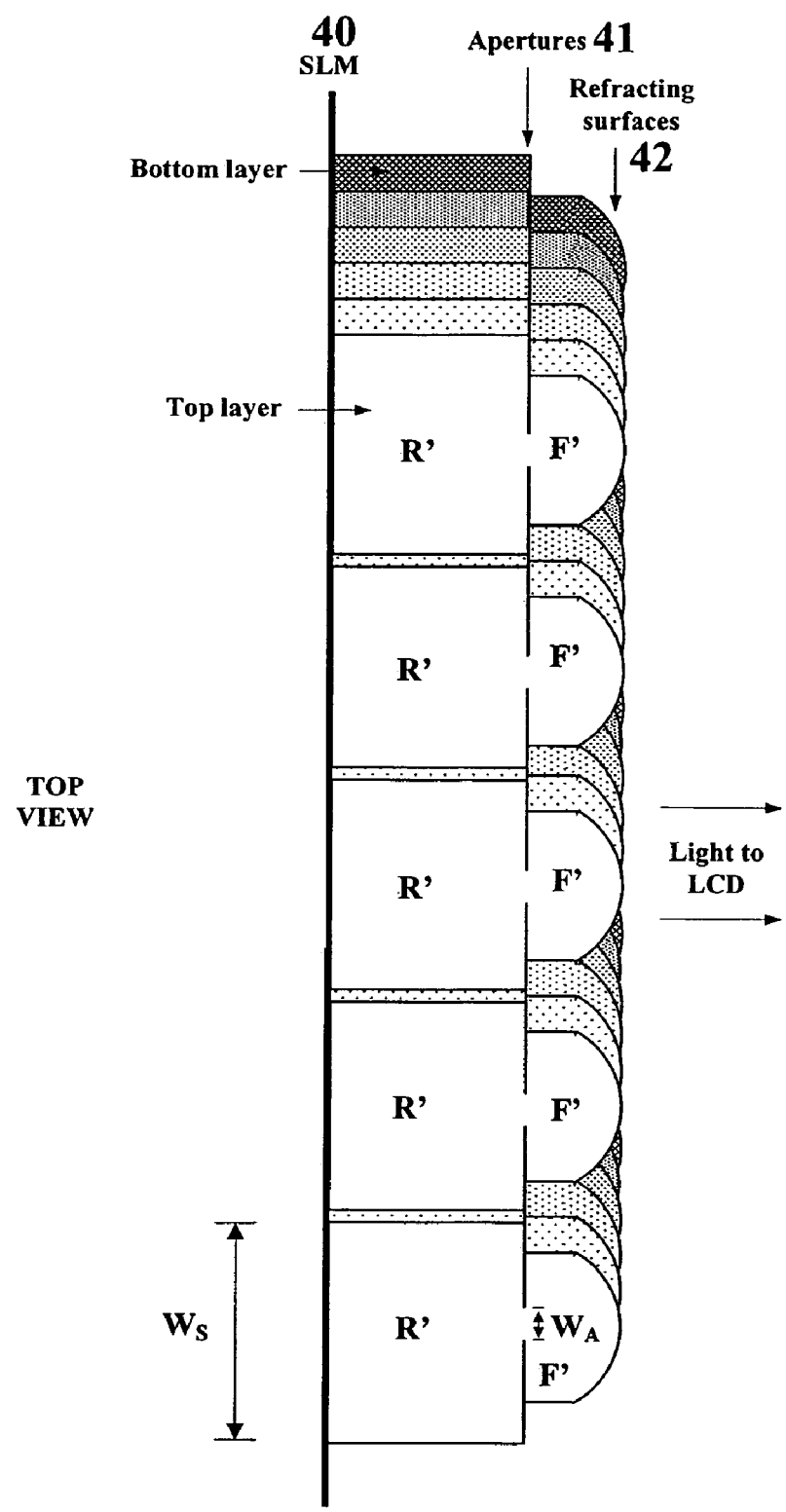
FIG. 7 is a plan view of a steering array construction in accordance with a further embodiment of the invention.

In an alternative embodiment, a planar SLM can be used for arranging the light output positions along what is referred to herein as semi-coaxial optics as illustrated in FIG. 7. In this arrangement, the output positions are arranged in a plane, and the apertures 41 are centred on the axis of the refracting front surfaces 42 of front portions F'. These surfaces 42 remain cylindrical, as in the embodiments illustrated in FIGS. 3 to 5, or are curved non-cylindrical surfaces having a parabolic or suchlike cross section. This configuration enables the use of a planar SLM 40, which can take the form of a high-resolution monochrome LCD. The SLM pixels, having a uniform horizontal pitch of 70 μm to 200 μm, preferably less than 100 μm, are arranged in a linear array across a source width $W_S$ behind the rear portion R' of each element. The example shown in FIG. 7 is of a six-layer array. The single SLM, which is a two-dimensional matrix, is effectively a set of thirty separate linear arrays of light output positions corresponding to each optical element respectively. A corresponding array of LEDs (not shown), which typically have a lower resolution than the SLM, for example having a 1.5 mm pitch, may be switched in correspondence with the SLM in order to generate light at the selected output position.

In this embodiment, each optical element may be formed from a flat rectangular rear part R' and a flat curved front lens part F'. The rear parts R' may be integrated to form an integral unit. A disadvantage of this arrangement is that the apertures are relatively narrow in width in order to counter the effect of varying illumination distance from the apertures 43. The aperture width $W_A$ is preferably less than one eighth the source width $W_S$. The number of array elements used, being inversely proportional to the aperture width $W_A$, is therefore relatively large. This disadvantage is however ameliorated by the simpler construction and the use of a single common SLM. Also, the small aperture width in relation to the radius of the refracting surfaces 42 enables the use of a non-cylindrical, e.g. paraboloidal, surface to compensate the varying illumination distance.

Figure 8:
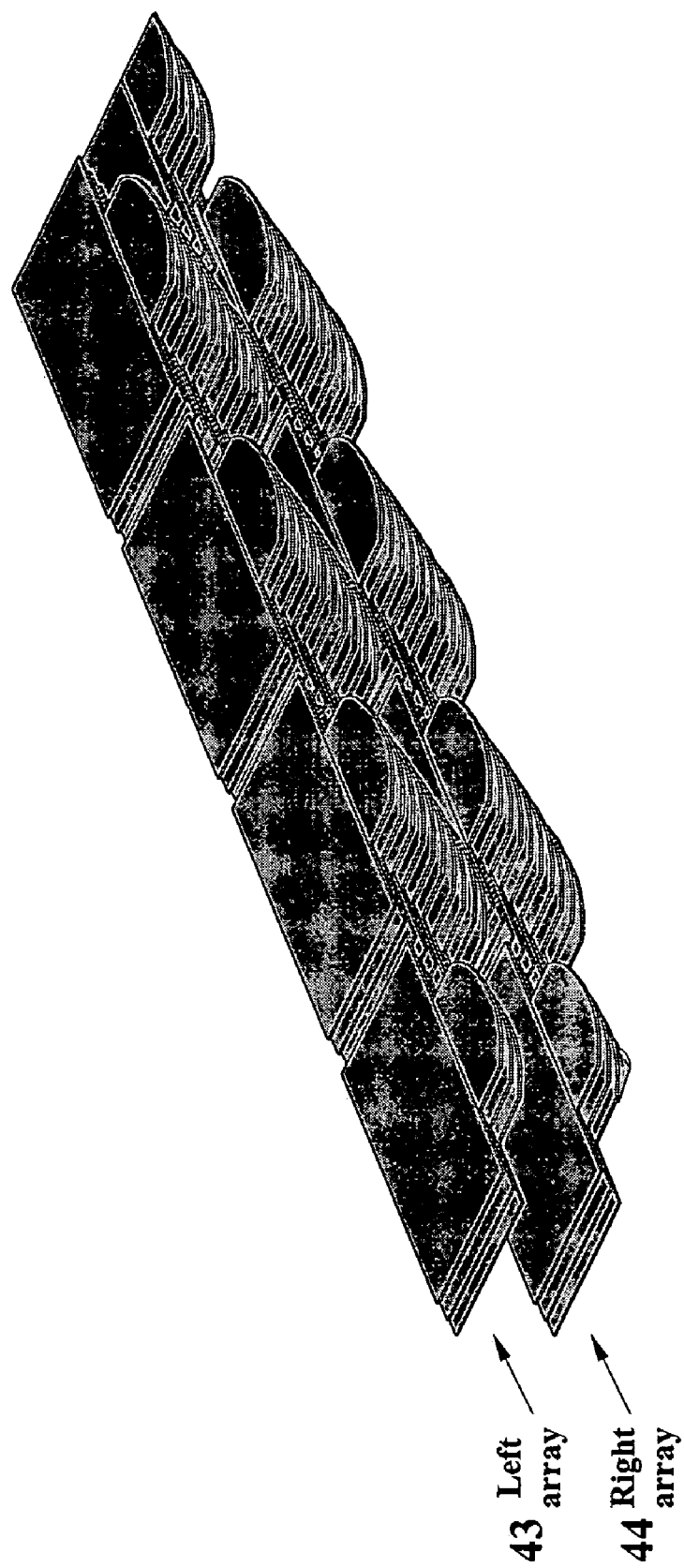
FIG. 8 is a perspective view of a set of two steering arrays similar to that shown in FIG. 7.

FIG. 8 illustrates a pair of steering arrays, similar to that shown in FIG. 7, in perspective view. In this embodiment, each steering array is supplied with illumination control to form exit pupils at a different eye of each viewer. Thus, for example, the top array 43 shown in FIG. 8 may be used to supply an image to a left eye of each viewer, and the lower array 44 may be used to supply an image to the right eye of each viewer. Each array in the embodiment shown in FIG. 8 includes four subsets of diagonally staggered optical elements. One of these subsets, forming the peripheral parts of the steering array, is divided into two parts, which are located at opposite edges of the array.

Figure 9:
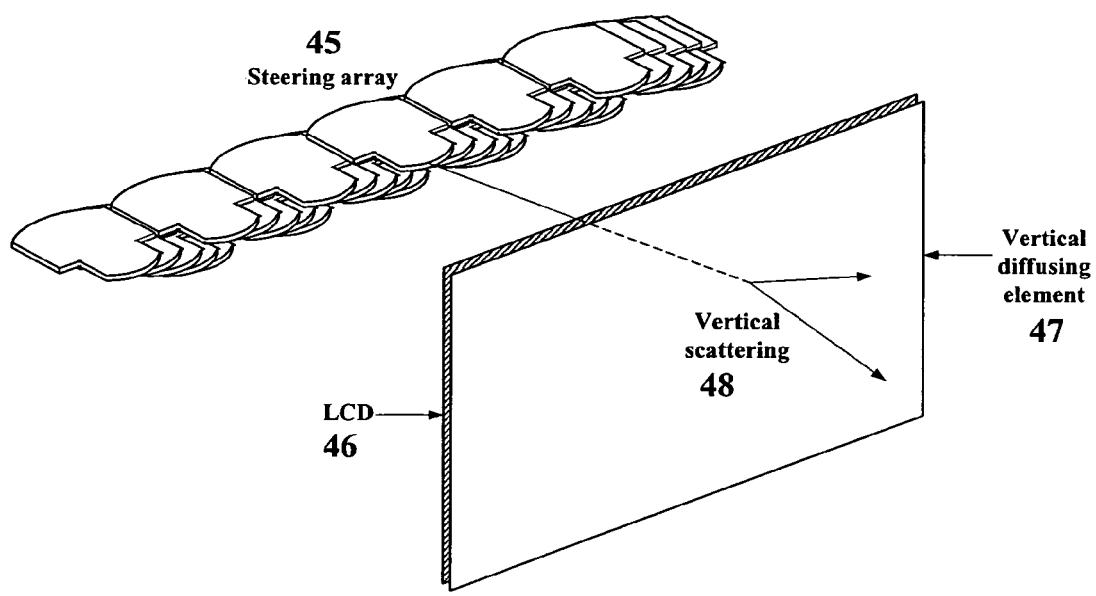
FIG. 9 shows a relationship between a steering array and a screen assembly.

As the total height of each steering array is in the order of a few centimetres, it is set some way back behind the screen assembly in order that the complete height of the screen assembly receives light from the array. In FIG. 9, a single fully coaxial array 45 is shown, but a similar arrangement is used for the semi-coaxial optics. In order for light from this narrow horizontal region to be seen over the complete height of the screen assembly, light passes through the LCD 46 and is then scattered in the vertical direction only 48 by a vertical diffusing element 47. A lenticular sheet with its lenses running horizontally could be used for producing a similar effect refractively, but this can produce a level of horizontal deviation that causes undesirable crosstalk, where left and right images are seen faintly by the inappropriate eyes. The function is thus preferably performed with the use of a holographic vertical-diffusing element.

Figure 10:
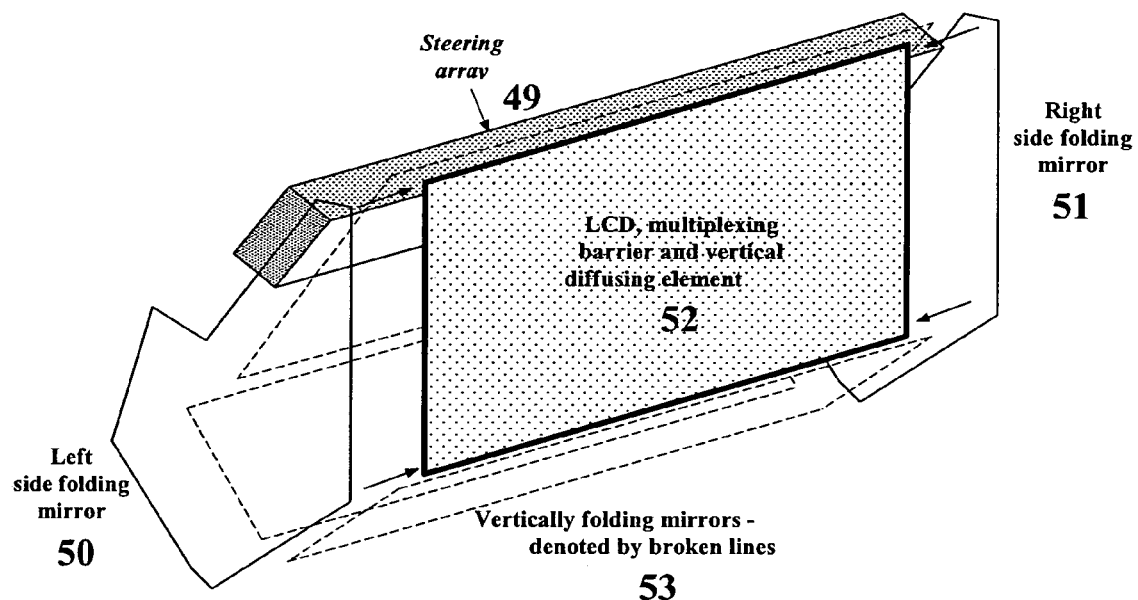
FIG. 10 is a perspective view of a display system in which folding mirrors can be used to shorten a steering array length and decrease a housing size.

If the display consisted solely of a steering array 45 and a screen assembly 46, 48 as shown in FIG. 9, then for a 20" display for example, the array would have to be around three times the width of the screen assembly, and around 0.8 meter behind it. This would require the use of a very wide array contained within an impracticably large housing. The dimensions can however be reduced by the use of mirrors to fold the light as illustrated in FIG. 10. This can be considered as being carried out in two stages.

Firstly, the width of the array can be reduced to a similar size as the screen assembly width by utilising two vertical mirrors located behind the screen assembly and to either side. These produce virtual images of the array that effectively increase its width. As the array has the versatility to place exit pupils over a relatively large angular field, it is possible to produce 'mirror-images' that can simulate a larger array by activating selected further radiation output positions which produce virtual images at the appropriate exit pupil positions.

Reduction in the overall depth of the display can be achieved by the use of three vertically folding mirrors 53 shown in FIG. 10 that function in a similar manner to folding in conventional back projected television displays. The left and right side folding mirrors 50 and 51 can be used in conjunction with these to provide a housing size that is comparable to a back projected television. For clarity of the figure, the side mirrors 50 and 51 are shown moved out from their actual positions. FIG. 10 shows that the steering array 49 is only slightly wider that the screen assembly 52.

Figure 11:
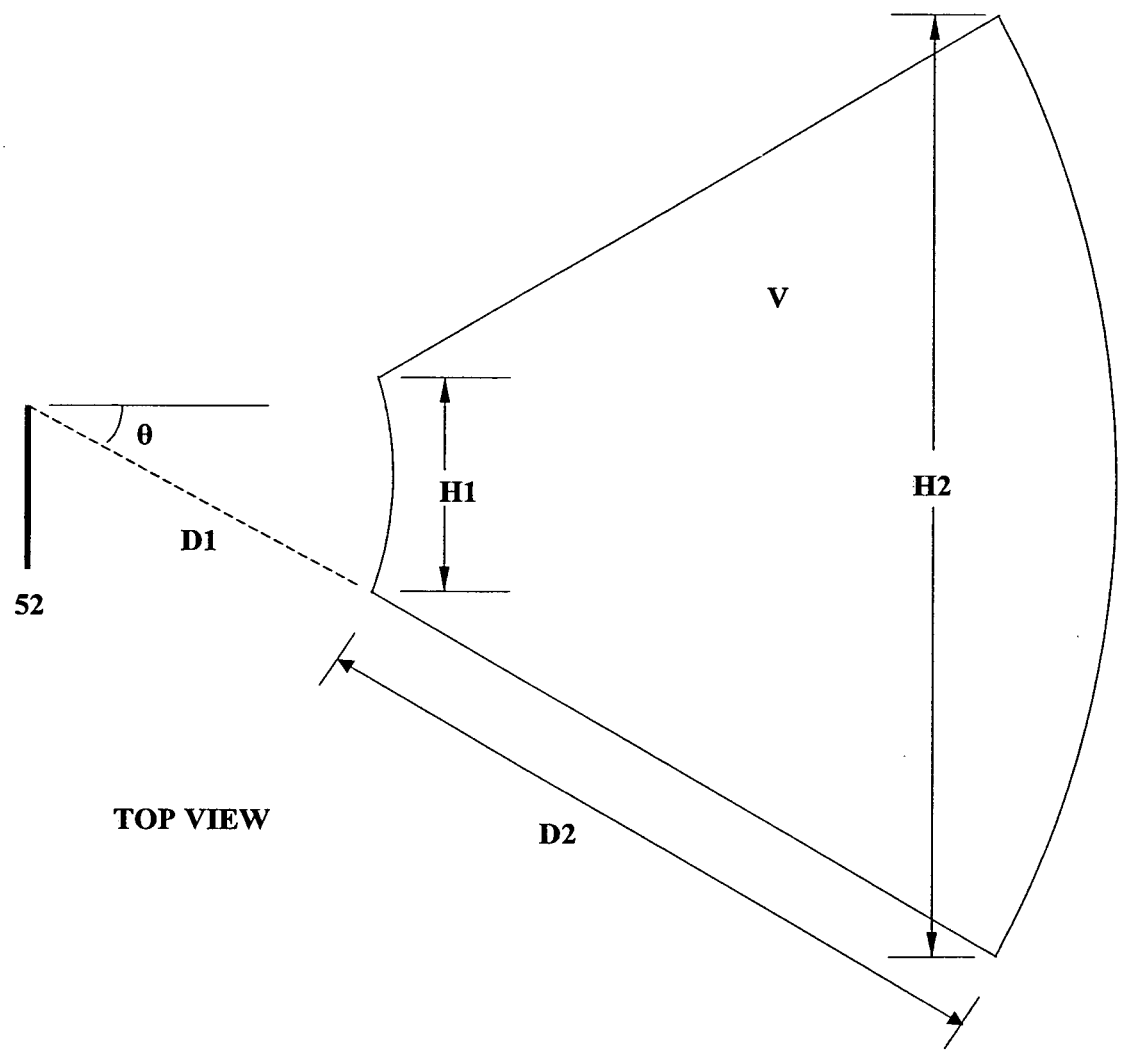
FIG. 11 shows a plan view of an exemplary viewing field and its dimensions.

FIG. 11 illustrates the geometry of a typical viewing field V in relation to the screen assembly 52 of the display system in plan view. The viewing field V ranges in horizontal size from a horizontal extent Hi, closest to the screen assembly 52 to a wider horizontal extent H2, in the part of the viewing field V furthest away from the screen assembly 52. The viewing field V begins at a first distance D1 from an edge of the screen assembly 52, typically of the order of 1 meter. The viewing assembly extends a further distance D2 away from the screen assembly, typically of the order of 2 metres further. The viewing field V extends through an angle θ, measured in relation to the axis of the screen assembly 52 at each edge thereof, outside the centre of the field of view in both directions. Typically, angle θ is at least 30°, more preferably at least 40°.

Figure 12:
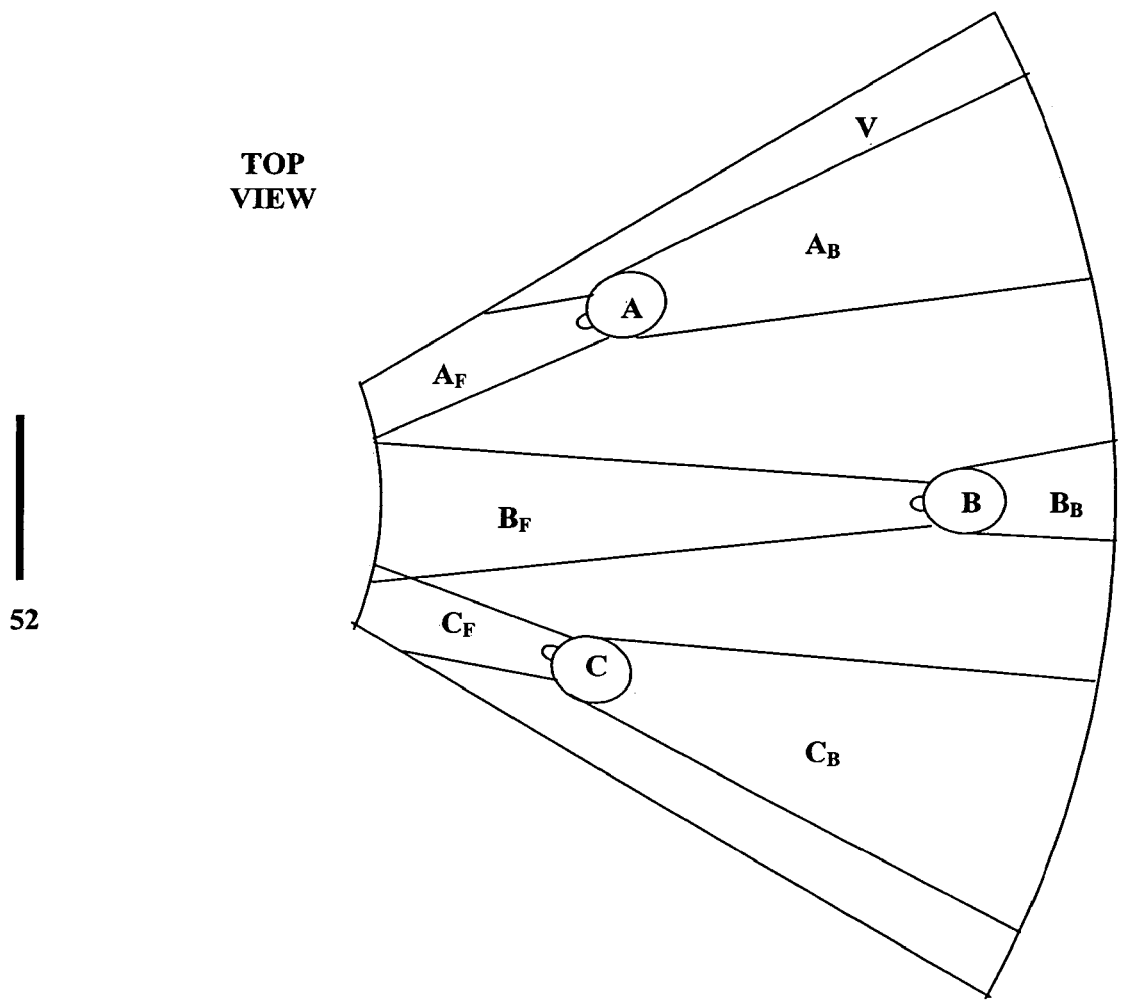
FIG. 12 shows a plan view of an exemplary viewing field and viewers therein.

FIG. 12 illustrates the viewing field shown in FIG. 11, with three separate viewers, A, B, C therein. In order for each viewer to receive a full view of the screen assembly 52, a volume $A_F$, $B_F$ and $C_F$ in front of the viewer must be free of obstruction. Furthermore, each viewer produces an obstruction volume, located behind each viewer respectively, $A_B$, $B_B$ and $C_B$, in which in which exit pupils cannot be formed, but where other viewers would not see a full view of the screen assembly in any case.

Figure 13:
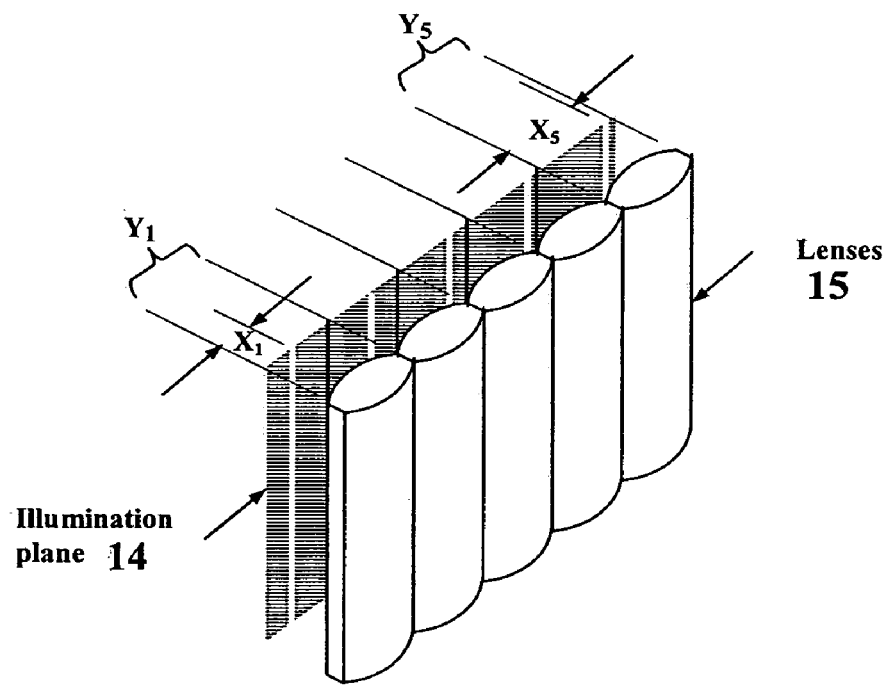
FIG. 13(*a*) shows a perspective view of an array of cylindrical lenses and coplanar light sources.
Figure 13:
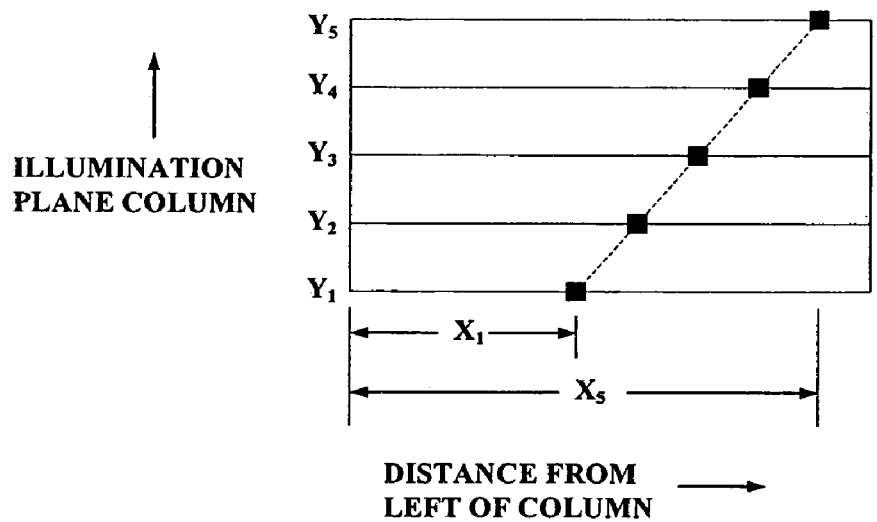

Reference is now again made to FIG. 13(a), which illustrates the manner in which steering of an exit pupil, both across the viewing field and fore-and-aft in the viewing field is achieved. For simplicity, the steering is explained using lens equivalent optics, namely an array of cylindrical lenses 15 to produce an exit pupil at a selected horizontal angle and a selected distance from the screen assembly. However, it should be appreciated that the selection of the radiation output positions across a steering array as shown in the preceding drawings is carried out in the same manner. Thus, the cylindrical lenses 15 may be taken to represent the front optical elements in a layer of the steering array. The angular position of the exit pupil is determined by the lateral positions of the sources with respect to the corresponding front optical element, and the distance of the exit pupil by the spacing of the sources. As the lenses 15 have a linear extent, the light sources are linear and all lie in one plane 14 as in FIG. 13(*a*). Xn is the distance from the left-hand edge of the set of light sources Yn associated with each optical element On. The positions of the light sources can be plotted as graph as in FIG. 13(*b*). The line 16 through the points is linear as shown in FIG. 13(*b*). The angular position of the exit pupil is determined by the average distance Xn, and the distance of the exit pupil by the gradient of the line. The further the exit pupil, the greater the slope of this line. Thus, the steering of the exit pupils is achieved by controlled selection of the light output positions across the steering array.

As both left and right images are presented simultaneously on the screen, measures have to be taken to ensure that left exit pupils are formed through the left image pixels, and right exit pupils through the right image. Left and right images are formed on alternate rows of pixels. A barrier that is located immediately behind the LCD can be used to perform this function, referred to herein as spatial image multiplexing. The barrier may operate in either a static or a dynamic mode.

The static barrier is considered first. In its simplest form, illustrated in FIG. 14(*a*), a simple parallax barrier 56 is used which consists of horizontal slits with a pitch slightly less than twice that of the LCD 57 vertical pixel pitch. This pitch allows for the parallax geometry. It can be seen that light from the left array 54 can only fall on the left pixels, and light from the right array 55 on to the right pixels. Although this barrier is relatively inexpensive to manufacture, it suffers from the disadvantages that two separate steering arrays are required, and the light throughput may be only in the region of 20% to 35%.

Figure 14:
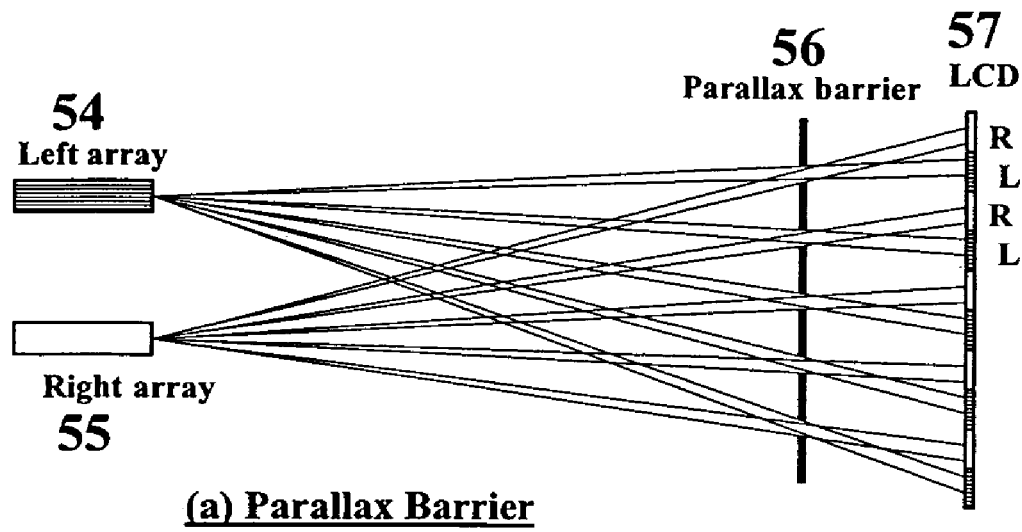
FIG. 14 is a side view showing the operation of two alternative methods of static spatial multiplexing.
Figure 14:
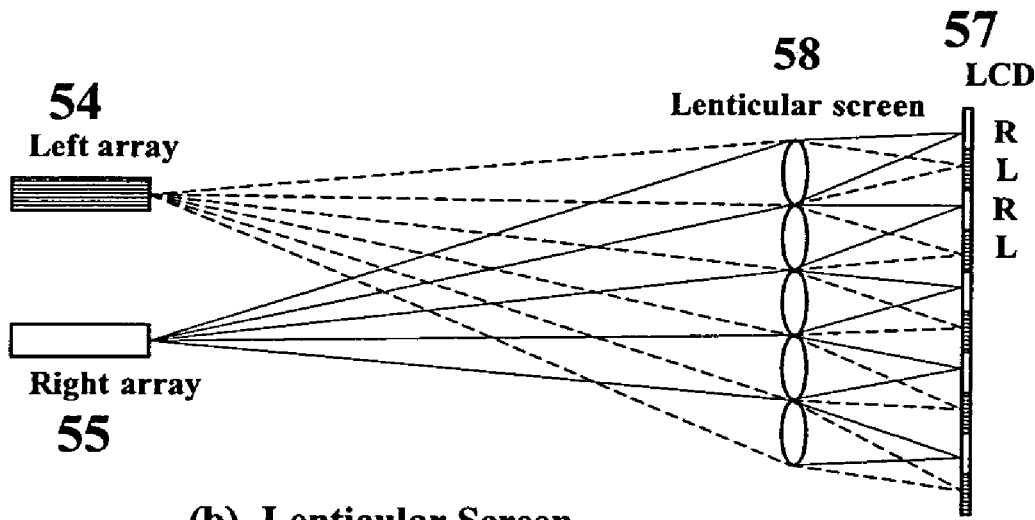

A higher throughput can be obtained by replacing the barrier with a lenticular screen 58 as in FIG. 14(*b*). The lenses of this screen run horizontally and have the same pitch as the parallax barrier. Virtually all the light from the left array 54 is gathered by the lenses and directed to the central region of the left pixels. Similarly, the majority of the light from the right array 55 is directed to the right pixels. The problems of horizontal deviation mentioned earlier when a lenticular screen is used as a diffuser may not be as critical in this arrangement as the lenses may have a much greater F-number than is required for vertical scattering. The vertical deviation is much smaller, and is sufficiently small to focus light only on the appropriate pixel rows.

Although both static barrier methods involve the use of two separate steering arrays, a single monochrome LCD can be used as the SLM 40 for the output of light at selected positions into both arrays. Note that this LCD is in addition to the image forming LCD and should not be confused with it. The SLM 40 should be sufficiently fast to allow for variation of the selected light output positions to steer the exit pupils in response to tracking of the viewers' head movements. A relatively inexpensive thin film transistor (TFT) device may be employed as the SLM 40. The static barriers will also not have aliasing effects where unwanted sampling artefacts are produced by the interaction of the barrier switching and the LCD frame rate.

Figure 15:
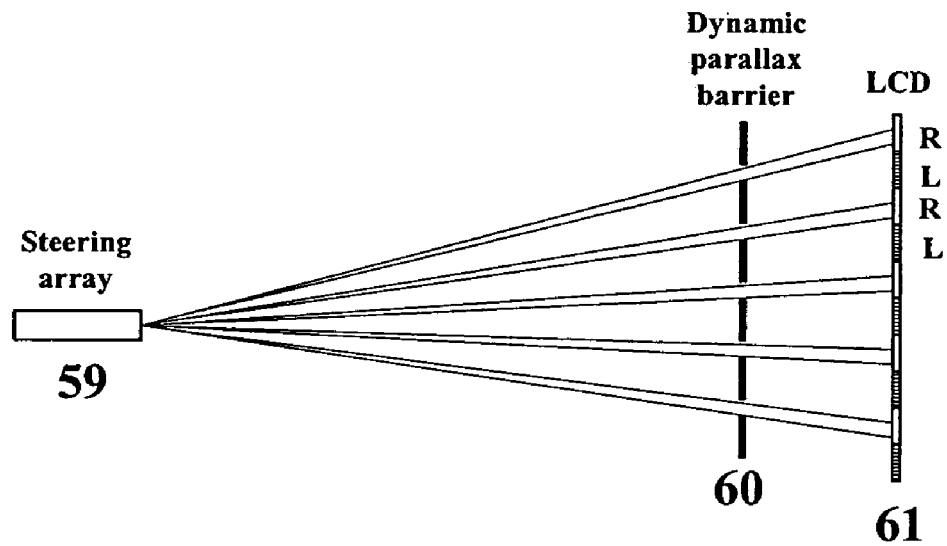
FIG. 15 is a side view showing the operation of a method of dynamic parallax barrier multiplexing.
Figure 15:
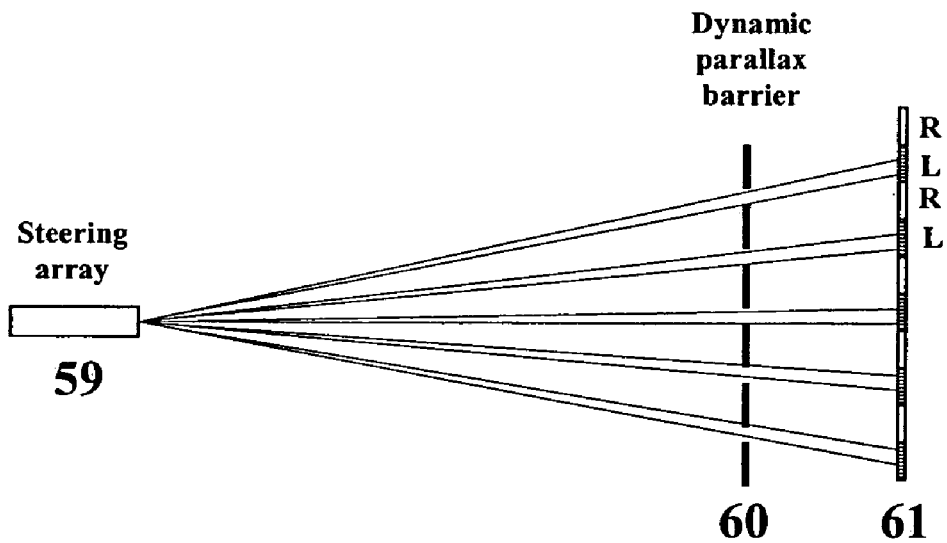

The use of two separate arrays can be avoided if a dynamic barrier is used. Again, its simplest form would be a parallax barrier. However, in this case it will be effectively moving as shown in FIG. 15. In FIG. 15(*a*) the apertures transmitting light on the barrier 60 allow light from the single steering array 59 to fall on the right-image rows of pixels on the LCD 61. The light from the illumination surfaces in the arrays is arranged so that exit pupils are formed in all the positions where right eyes are located by the head tracker.

The barrier then changes state to enable light to fall on the left-image pixels as in FIG. 15(*b*). The illumination regions are moved to the right to provide the left exit pupils. During the transition period when the barrier is changing state, all light sources will be off. If the barrier is switched at, or near the LCD frame rate, aliasing will occur. A ferroelectric (FE) liquid crystal or pi-cell array could be used for the dynamic barrier.

In order for dynamic barrier multiplexing to be carried out, the illumination may be controlled by either fast FE linear SLMs, or by the use of white LED arrays.

Again, the light throughput will be relatively low, but the geometry of the barrier may allow around 35% to 40% of the light to pass as the overall height of a single array is considerably less than two arrays which also require a gap between them.

There are other forms dynamic multiplexing could take. A parallax barrier or lenticular sheet could be moved by voice-coils, but this is not a very elegant solution. Another possibility could be to use the birefringence of a liquid crystal material in contact with a horizontally running microprism array in the gap between substrates. Used in conjunction with a lenticular sheet this could be used to direct the light to left and right rows in succession.

As the steering array acts effectively as the backlight for the display, it is important that the observed intensity appears constant across the width of the LCD. With an array, care must be taken to ensure that the elements do not produce a series of vertical bands. Referring to FIG. 6, it can be seen that if the light from each of the bright aperture image regions is scattered vertically, even illumination will be observed if the sides of each aperture image line up exactly with its neighbours, i.e. if the aperture images are precisely contiguous. In practice, this is not possible due to manufacturing tolerances, and to lens aberrations leading to aperture width variation.

Figure 16:
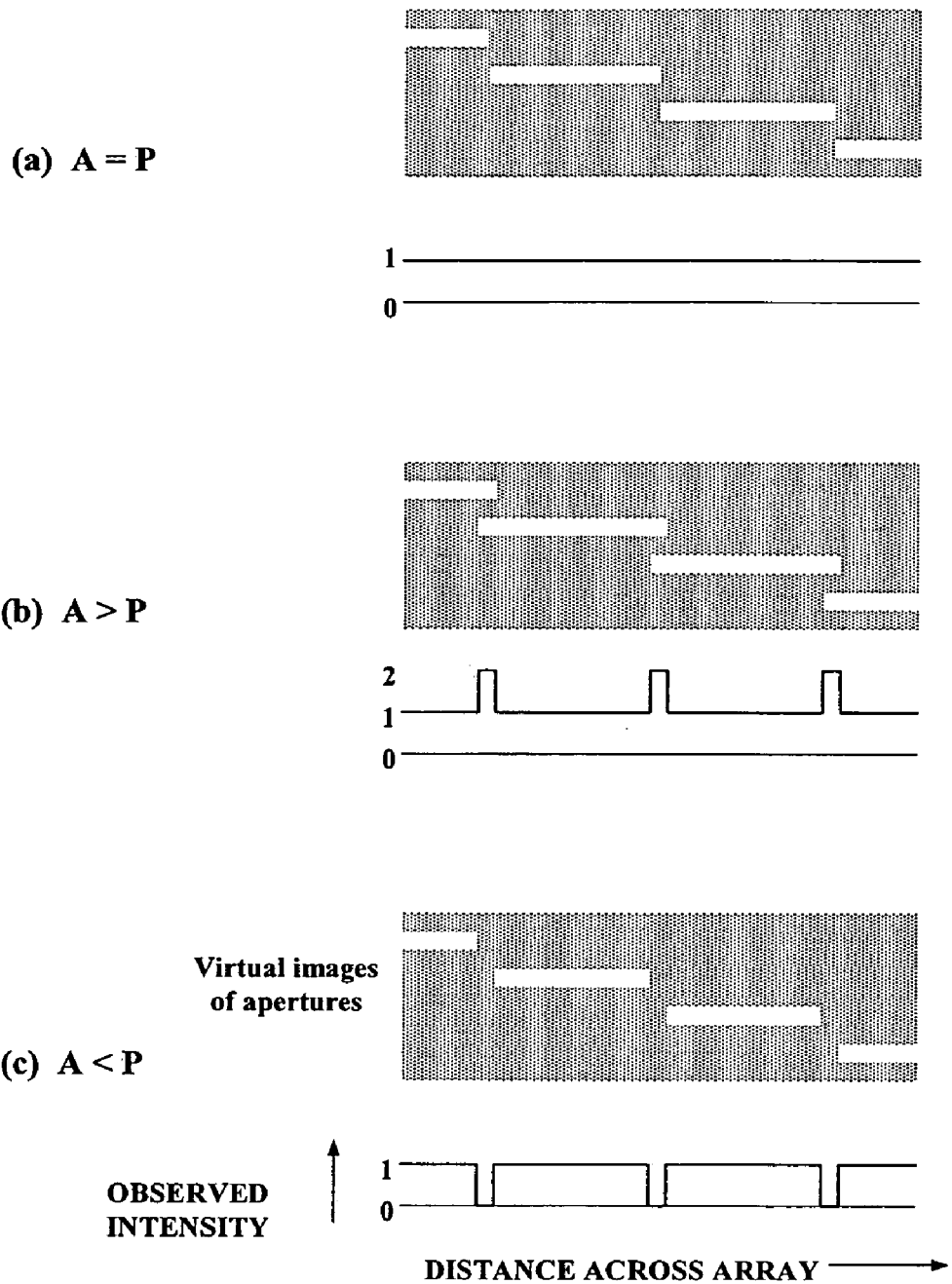
FIG. 16 shows the effect of aperture image width variation on the perceived intensity produced by vertical extension of the images.

The effect of aperture image width variation is shown in FIG. 16. In FIG. 16(*a*) the aperture image edges are exactly in line. The lower part of this figure shows there is no variation in brightness when the light from the apertures is scattered vertically. When there is overlap, as in FIG. 16(*b*) where the aperture image widths are greater than their pitch, vertical bands will appear on the screen that will be about twice as bright as their surroundings. When there is a gap, as in FIG. 16(*c*) where the images are narrower than the pitch, dark bands will be observed.

Figure 17:
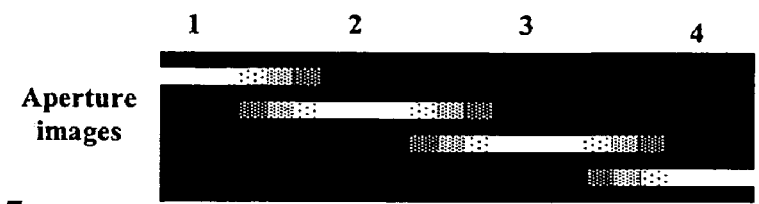
FIG. 17 is a front view of aperture images produced by an array having graduated aperture edges.
Figure 18:
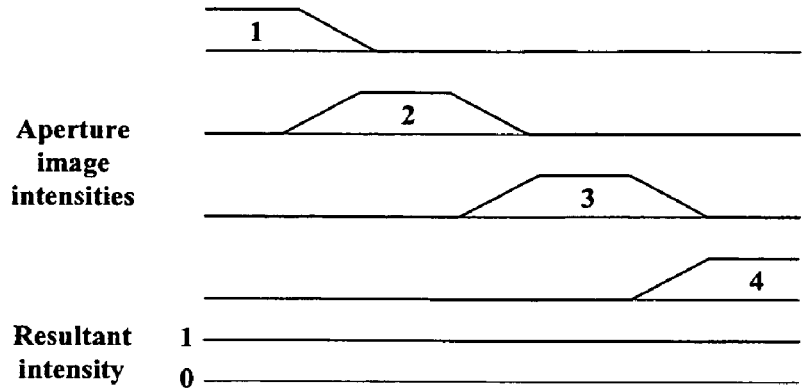
FIG. 18 shows the effect of the graduation of aperture edge following vertical extension of the images.
Figure 18:
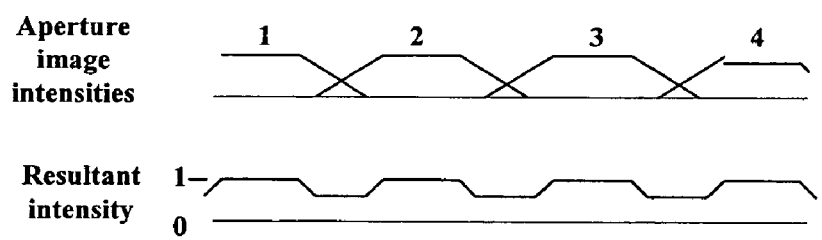
Figure 18:
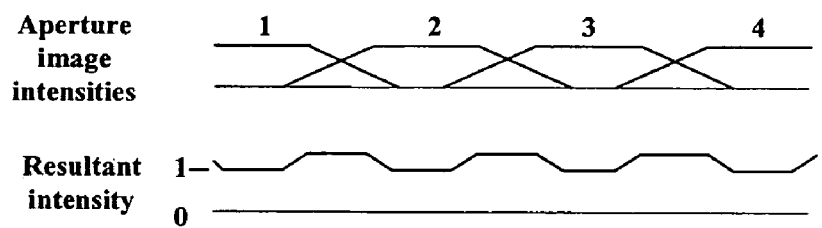

Experiments where the apertures have been simulated indicate that the effect of the non-alignment can be rendered subjectively invisible by fading the sides of the apertures as illustrated in FIG. 17. The ideal intensity variation with distance across the array is shown in FIG. 18(*a*), and the corresponding resultant observed perfectly constant intensity after vertical mixing is shown at the bottom. The variation in transmissivity at each edge of the aperture is such that the transmissivity gradually varies approximately linearly from maximum to minimum over a distance of at least one tenth of the total aperture width, more preferably in the region of one third of the total aperture width. In the case of such graduation of the transmissivity profile, the width of the aperture is taken as the distance between points at half maximum transmissivity.

When the aperture images are narrower than their pitch as shown in FIG. 18(b), there will be a variation in observed intensity as shown in the lower figure but it does not drop to zero. Note that the resultant intensity variation shown here is exaggerated and would be in excess of the maximum amount that viewers should be expected to tolerate, but it illustrates clearly the advantageous effect of fading. In FIG. 18(c), the effect of fading on aperture images that are wider than their pitch is shown. In this case the intensity does not double as it would without fading.

It should be noted that the term "horizontal" used herein in relation to the steering optics is intended to denote the orientation of elements therein with respect to the screen assembly in an optical sense; hence if for example the steering array is arranged within the display in a vertical orientation, and a folding mirror is used to transform the output of the array through 90° to the horizontal, the vertical orientation of the array should be taken as an (optically) horizontal orientation for the purposes of understanding the present invention.

The above embodiments are to be understood as illustrative examples of the invention. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

What is claimed is:

1. An autostereoscopic display system having a viewing field across which the system is capable of steering exit pupils, in each of which a viewer is capable of viewing an image for a selected eye, wherein the system comprises an image forming device for generating an image by selective attenuation of radiation, an array of lens elements for projecting radiation beams towards said image forming device, an array of radiation output positions for outputting radiation into said array of lens elements, and an array of apertures located between said lens elements and said radiation output positions, wherein a plurality of different sets of radiation output positions are provided, each different set corresponding with a different one of said lens elements and extending over a given horizontal extent, the radiation output positions being selectable such that an exit pupil is formed in a selected part of the viewing field by selection of at least one radiation output position from each of the plurality of sets of radiation output positions, wherein said array of apertures includes a plurality of apertures, each said aperture being located between a respective set of radiation output positions and the corresponding lens element and limiting the horizontal extent of a radiation beam projected towards said image forming device from the lens element after being output from one of the radiation output positions, each said aperture having a horizontal width which is less than the horizontal extent of the corresponding set of radiation output positions.

2. An autostereoscopic display system according to claim 1, wherein said apertures have a horizontal transmissivity profile which is graduated at the edges thereof, to provide overlap between radiation passing through different apertures in the radiation projected towards the image forming device.

3. An autostereoscopic display system according to claim 2, wherein said horizontal width is defined by the width of the aperture at half maximum transmissivity.

4. An autostereoscopic display system according to claim 1, wherein said lens elements comprise refractive lens elements.

5. An autostereoscopic display system according to claim 4, wherein said lens elements are arranged in a configuration in which at least two elements overlap in a vertical direction.

6. An autostereoscopic display system according to claim 1, wherein the apertures are arranged such that the radiation projected towards the image forming device has a substantially uniform intensity in a horizontal direction.

7. An autostereoscopic display system according to claim 1, wherein the image forming device comprises a planar element having areas which are selectively actuable to transmit radiation.

8. An autostereoscopic display system according to claim 1, wherein the image forming device is arranged to form images for a left eye and a right eye respectively in separate rows.

9. An autostereoscopic display system according to claim 1, wherein the system comprises a vertical diffusing and/or vertical refracting element located between the image forming device and the viewing field.

10. An autostereoscopic display system according to claim 1, wherein the system includes a first set of apertures arranged to transmit radiation for a left eye image and a second set of apertures arranged to transmit radiation for a right eye image.

11. An autostereoscopic display system according to any of claims 1, wherein the system is arranged to transmit images in a field sequential operation, wherein image frames for a left eye image and for a right eye image respectively are formed on said image forming device alternately in synchronism with selection of radiation output positions for left eye and right eye exit pupils respectively.

12. An autostereoscopic display system according to claim 1, wherein the system is arranged to simultaneously select a plurality of radiation output positions from each said set of radiation output positions to form a plurality of exit pupils at a plurality of different viewer positions.

13. An autostereoscopic display system according to claim 1, wherein said radiation output positions are selectable such that an exit pupil is steerable in the viewing field to alter a horizontal angle of the exit pupil with respect to the image forming device by variation of the selected output positions.

14. An autostereoscopic display system according to claim 1, wherein said radiation output positions are selectable such that an exit pupil is steerable in the viewing field to alter a distance of the exit pupil from the image forming device by variation of the selected output positions.

15. An autostereoscopic display system according to claim 1, wherein said radiation output positions are arranged in a planar configuration.

16. An autostereoscopic display system according to claim 1, wherein said radiation output positions are arranged in curved configurations centred on respective apertures.

17. An autostereoscopic display system according to claim 1, wherein said lens elements are arranged to project radiation via said apertures using total internal reflection.

18. An autostereoscopic display system according to claim 1, wherein said aperture width is less than a quarter of the extent of the corresponding set of radiation output positions.

19. An autostereoscopic display system according to claim 18, wherein said aperture width is less than an eighth of the extent of the corresponding set of radiation output positions.

20. An autostereoscopic display according to claim 1, wherein said lens elements are arranged in a staggered configuration.

21. An autostereoscopic display system having a viewing field across which the system is capable of steering exit pupils, in each of which a viewer is capable of viewing an image for a selected eye, wherein the system comprises an image forming device for generating an image by selective attenuation of radiation, an array of lens elements for projecting radiation towards said image forming device, and an array of radiation output positions for outputting radiation into said array of lens elements, wherein a plurality of different sets of radiation output positions are provided, each different set corresponding with a different one of said lens elements, the output positions being selectable such that an exit pupil is formed in a selected part of the viewing field by selection of at least one radiation output position from each said set of said radiation output positions, wherein the system is controllable such that for each said set of radiation output positions, a plurality of radiation output positions are selectable to output radiation simultaneously to produce a plurality of sets of two exit pupils, corresponding to the left and right eye positions of a plurality of viewers, at selected locations within the viewing field.

* * * * *